United States Patent [19]

Brennesholtz

[11] Patent Number: 5,712,691
[45] Date of Patent: Jan. 27, 1998

[54] METHOD AND APPARATUS FOR AREA DEPENDENT DYNAMIC BLUE DE-FOCUSING

[75] Inventor: Matthew Scott Brennesholtz, Westchester County, N.Y.

[73] Assignee: Philips Electronics North America Corporation, New York, N.Y.

[21] Appl. No.: 567,254

[22] Filed: Dec. 5, 1995

[51] Int. Cl.⁶ .................... H04N 5/64; H04N 9/31; H04N 5/74

[52] U.S. Cl. .................... 348/744; 346/778; 346/779; 346/764; 315/369

[58] Field of Search .................... 348/745, 776, 348/778, 779, 806, 655, 807, 656, 380, 381, 808, 744, 625, 780, 764, 835; H04N 17/04, 9/73, 5/208, 5/213, 5/64, 9/31, 5/74

[56] References Cited

U.S. PATENT DOCUMENTS

| | | | |
|---|---|---|---|
| 3,647,945 | 3/1972 | Hannan | 178/5.4 ST |
| 4,369,396 | 1/1983 | Judd | 315/369 |
| 4,668,977 | 5/1987 | Ohno et al. | 348/778 |
| 4,733,299 | 3/1988 | Glenn | 385/140 |
| 4,922,330 | 5/1990 | Saito et al. | 358/29 |
| 5,153,713 | 10/1992 | Kyuma et al. | 358/29 |
| 5,175,615 | 12/1992 | Ohara | 358/29 |
| 5,223,769 | 6/1993 | Priere et al. | 315/370 |
| 5,260,797 | 11/1993 | Muraji et al. | 358/231 |
| 5,262,848 | 11/1993 | Kim | 358/29 |
| 5,298,985 | 3/1994 | Tsujihara et al. | 348/745 |
| 5,337,092 | 8/1994 | Minoura | 348/776 |
| 5,434,595 | 7/1995 | Macaulay | 345/207 |

Primary Examiner—John K. Peng
Assistant Examiner—Peter Kovacs
Attorney, Agent, or Firm—Michael J. Balconi-Lamica

[57] ABSTRACT

A method and projection television system for projecting images having a plurality of color components, includes a device for filtering a first color component signal from a composite signal to provide a filtered first color component signal. A defocusing mechanism defocuses the first color component signal based on the filtered first color component signal. A gain adjustment device adjusts a gain of at least one other of a plurality of color component signals of the composite signal. An amount of defocusing performed by the defocusing mechanism and a gain adjustment by the gain adjustment device are dependent on a content of the composite signal. In another aspect of the invention, a spot wobble scheme may be employed alone in a static defocussing system, without dependence upon the video signal content.

28 Claims, 6 Drawing Sheets

METHOD AND APPARATUS FOR AREA DEPENDENT DYNAMIC BLUE DE-FOCUSING

BACKGROUND OF THE INVENTION

1. Field of the Invention

The present invention generally relates to a method and apparatus for use in a cathode ray tube (CRT) for increasing the total screen luminance in a CRT projection television, and more particularly to a method and apparatus for increasing the blue output (and therefore the white output) by defocusing the blue without significantly affecting resolution.

2. Description of the Related Art

With a typical projection display television receiver, three separate cathode ray tubes (CRT) are utilized which have respective red, green and blue phosphors, for projecting respective red, green and blue television pictures. These three CRT pictures are projected onto a single display screen by projection lenses. The red, green and blue television pictures are thereby superimposed on the screen to form a projected color television picture.

Generally, in the cathode ray tube (CRT)-based projection set, the total white luminance is limited by the amount of blue that can be produced by the blue tube. While the red and green tubes are capable of producing more light, if the red and green phosphor tubes are made to produce more light then the white produced turns into a yellowish white. Such a yellowish white is unacceptable to the consumer.

Thus, in CRT-based projection TV, the overall screen brightness is limited by the blue phosphor. This happens because the light outputs of the red and green phosphors are substantially linear with current. Hence, the emission characteristic of each of the red and green phosphors is substantially linear up to high levels of drive voltage (e.g., up to high values of electron beam current). However, the blue phosphor is strongly non-linear, and moreover demonstrates a saturation effect at high currents, about 10 mA (depending on focus quality). Thus, the emission characteristic of the blue phosphor exhibits a saturation condition at much lower levels of the beam current and of CRT drive voltage than do the red and green phosphors.

Moreover, at saturation, the luminance of the blue phosphor remains approximately constant even as the current density increases. Thus, even if the white balance of the picture is adjusted to be correct at some moderate level of display brightness, the white color produced on the display screen by combining light from the red, blue and green CRTs will have an insufficient level of blue components and so will have an excessively low color temperature and will not produce a substantially pure white color at high levels of emitted light.

FIG. 1 shows the nonlinearity of the blue phosphor, and approximates it with a square root function:

$$L_b = I_b^{(1/2)} \quad (1)$$

It is noted that the current levels used in this test (FIG. 1) were not high enough to drive the blue all the way into saturation. The 100% current level in FIG. 1 for the blue tube represents a beam current of 2.3 mA. The 100% luminance level varies with tube color.

FIG. 1 also illustrates the measured data for the green. Here, the best approximation is:

$$L_g = I_g^{0.909} \quad (2)$$

In both cases, I is current density and L is luminance.

While FIG. 1 does not illustrate the measured red data, the linear curve shown is a very good approximation of the red phosphor.

Thus, as mentioned above, if one attempts to make the overall system brighter by driving all three tubes harder with a focused spot, the red and green luminance will increase with current almost linearly, but the blue phosphor luminance will increase much more slowly. If drive levels reach the saturation value, it will not increase at all. In either case, white areas will turn an unacceptable yellowish color. Therefore, all three tubes must be current limited to the peak current which the blue tube can tolerate.

There are several conventional methods of increasing the blue luminance. A first conventional method of obtaining more blue light is to defocus the blue CRT gun. Due to the non-linear saturation effect in the blue spectrum, by spreading the electron beam over a larger area, the total blue light output is increased without increasing the total power to the screen. Current projection systems typically use this effect to increase the amount of blue. However, if the blue is refocused too much, resolution is disadvantageously reduced. This is a problem.

This conventional method is often referred to as "Static Blue Defocus".

FIG. 2 shows the change in luminance of a blue projection tube as the tube is defocused, at a constant anode current. As shown, the tube has a "best focus" focus voltage at about 8050 volts. As the focus voltage changes from 8050 volts to 8400 volts at a constant anode current, the brightness increased from about 15 to 26.5 Ft-Lamberts. This represents a 175% increase in brightness.

This first conventional method of increasing the blue luminance takes advantage of this increase by defocusing the blue gun.

When a blue phosphor tube in a set is deliberately defocused with a direct current (DC) voltage in order to increase blue luminance, unacceptable picture artifacts may occur. The resolution of the eye is very poor in the blue wavelength spectrum and the eye typically does not perceive the loss of resolution from the blue defocussing except at high levels of defocus. However, if a solid white area is surrounded by a darker area and the blue tube is defocused, there will be a blue fringe around the white area that will become visible.

FIG. 3 illustrates the dynamics of the above problem. The four curves in FIG. 3 are each calculated based on a gaussian electron beam spot profile. The focused spot has a gaussian half-width of 1 unit and the defocused spot has a gaussian half-width of 5 units. The non-linear luminance function is assumed to be $L=\sqrt{I}$ (equation 1), where L is the luminance and I is the local current density. While neither of these assumptions (gaussian profile or square root nonlinearity) may actually be encountered in practice, they readily illustrate the above-mentioned problem.

FIG. 3 represents a vertical edge in an image, with white to the left, black to the right and the video transition at x=0. The electronic transition is assumed to take place in zero time as the electron beam scans from left to right, to emphasize the effect of spot size and nonlinearity. For the linear case, both focused and de-focused, the optical transition corresponds to the electronic transition and the luminance is 50% at x=0. For the defocused case, the transition region of course is much wider than it is for the focused case, due to the larger spot size.

When the phosphor is non-linear with beam current, the optical transition shifts away from x=0 toward the black side of the edge.

In the focused case, the shift is 0.47 units, which is slightly less than one-half of the gaussian spot size of 1.0 units. In the defocused case, the shift is still about ½ of a spot size, or approximately 2.38 units. If the original, focused spot size is comparable to the pixel size, this edge shift represents about 2 pixels when the tube is defocused. Therefore, there would be a 2-pixel wide blue border around white areas if the blue tube were defocused by this amount to increase its luminance.

A second conventional method to increase the amount of blue employs a known "Blue Stretch" circuit. This circuit pre-emphasizes the blue video signal to compensate for the phosphor non-linearity.

For example, if the luminance exactly followed equation (1), squaring the blue video signal would exactly compensate for the non-linearity:

$$B'=B^2 \qquad (3)$$

Then, this B' video signal is applied to the cathode of the blue tube and the overall transfer curve from $I_b$ to $L_b$ would be linear. However, there is an upper limit to the amount of "blue stretch" that can be used, as determined by several factors.

For example, the amount of "blue stretch" employed is limited by the current capability of the blue cathode, the spot size vs. beam current properties of the gun, the current capability of the high voltage (HV) power supply, the thermal power rating of the tube, and, ultimately, by the saturation level of the blue phosphor.

As described above, each of the above conventional methods is problematic in increasing the blue output and yet retaining optimum resolution.

A further disadvantage of conventional static blue defocus is that every blue tube acts differently when defocussed. Some electron guns lose their spot quality so quickly with defocus that they cannot be used with even a small amount of defocus.

Conventional projection television sets typically combine these two methods to increase blue as much as possible. Blue is statically defocused as much as possible, without degrading resolution or causing blue fringing. The blue video signal is given as much blue stretch as possible without overloading the tube or the power supply. Even with these two methods combined, there is still insufficient blue light to always meet marketing requirements.

SUMMARY OF THE INVENTION

It is therefore an object of the present invention to provide a method and apparatus for overcoming the above problems of the conventional systems and methods.

Another object of the invention is to provide a method and apparatus for increasing the blue output (and therefore the white output) by defocusing the blue without significantly affecting resolution.

Yet another object is to provide special defocus circuitry in which the blue defocus is made dependent on the video signal content.

A further object is to provide a spot wobble defocusing scheme for affecting the beam vertically while not affecting the beam horizontally.

In a first aspect of the invention, a low pass filter is provided in a projection system, which functions as a "blue size detector". The low pass filter is added to the chassis for detecting when the video signal calls for a relatively large area of blue (e.g., 5×5 pixels), so that the blue can be defocused much more without significantly affecting resolution.

For example, in a relatively large area of white, with some detail in the white, such as a beach scene with white sand or a white shirt, the size detector detects the large bright area, and allows the blue to defocus. With the invention, since the entire area is calling for blue, there is no blue fringing at the edges.

Thus, a first color component (e.g., blue) is increased by defocussing the first color component by, for example, electrostatic, electromagnetic or spot wobble techniques. The amount of defocus allowable is determined by a filtered first color component signal. The other color component signals (e.g., red and green) are increased (e.g., multiplied) by an amount also determined by the filtered first color component signal. Since the other color components are approximately linear, increasing their color component signals will increase the corresponding color components by the same factor.

Thus, with the structure and method of the present invention, circuitry is provided for defocusing the blue tube in order to increase overall system luminance. The invention makes the blue defocussing operation dependent on the video signal content, since static defocusing leads to a blue border around a white area.

Hence, when there is a solid area of blue, defocusing of the blue poses no problems because there is no edge for the blue to spill over and form a blue border. At an edge, the blue gun is brought to a good focus to avoid this spill-over. Conversely, when the video signal requires brightness levels low enough so the focused blue gun can produce sufficient luminance, the inventive circuitry makes a suitable determination and thus there is no need to defocus.

Further, a spot wobble defocusing scheme is provided according to the present invention for affecting the beam vertically while not affecting the beam horizontally.

Further, a spot wobble defocusing scheme is less dependent on the details of the individual electron gun than a conventional electrostatic or electromagnetic defocus scheme. Therefore, spot wobble allows easier tube setup and will require fewer tubes to be rejected during manufacturing of the same.

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF PREFERRED EMBODIMENTS OF THE INVENTION

Figure 4:
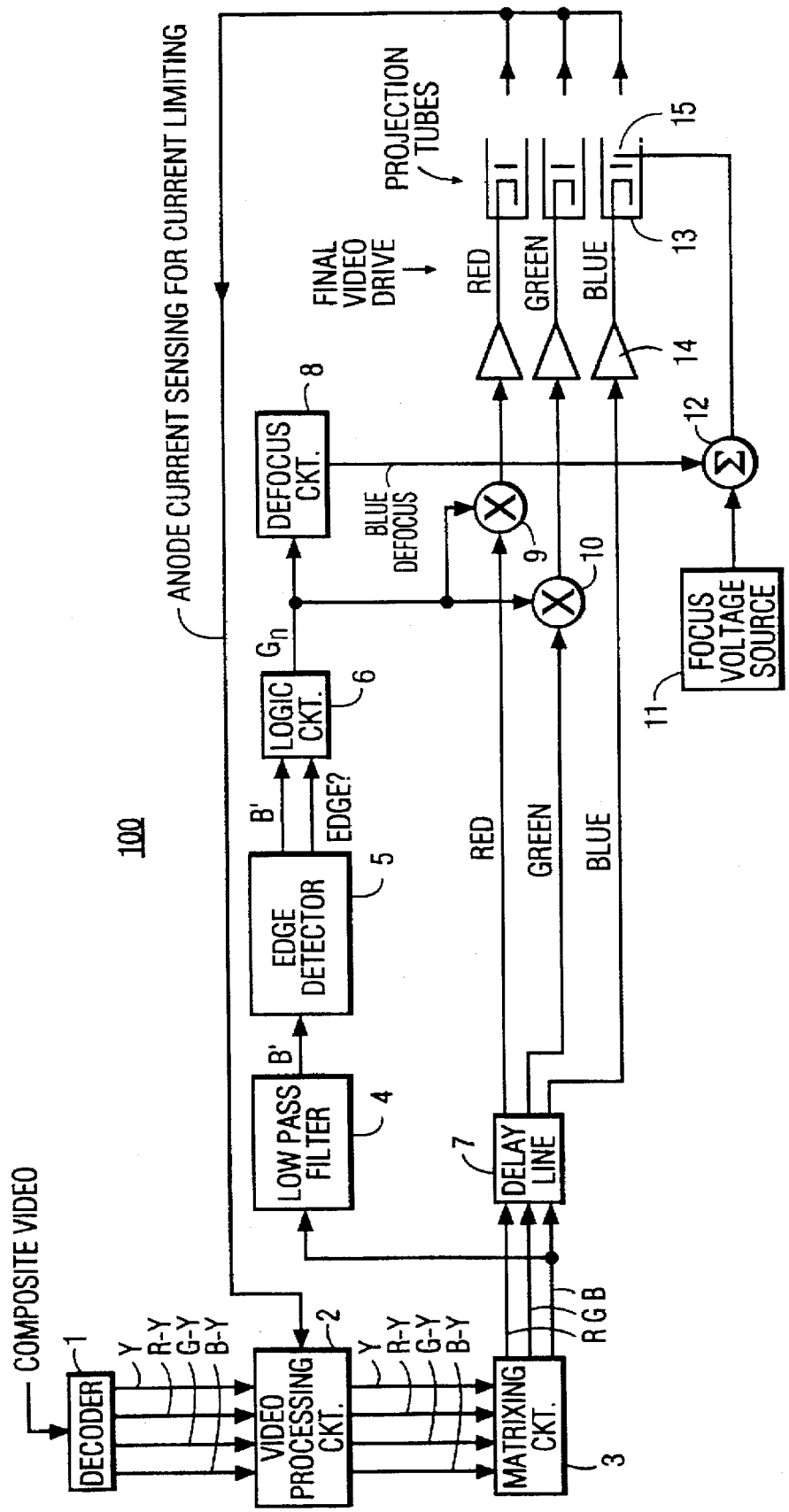
FIG. 4 is a block diagram of a projection television system according to a first embodiment of the present invention.

Referring now to the drawings, and more particularly to FIG. 4, there is shown an apparatus according to the present invention.

As mentioned above, in a typical CRT-based projection set, the total white luminance is limited by the amount of blue that can be produced. The red and green tubes are capable of producing more light, but if they do, the white turns into a yellowish white, which is unacceptable to the consumer. One way to get more blue light is to defocus the blue gun.

Due to the non-linear saturation effect in the blue, by spreading the electron beam over a larger area, the total blue light output is increased without increasing the total power to the screen. As mentioned above, conventional projection sets use this effect to increase the amount of blue, but if the blue is defocused too much, resolution is reduced.

In the system according to the present invention, a "blue size detector" low pass filter is added to the chassis which detects when the video signal requires a relatively large area of blue (e.g., an area 5×5 pixels square), and the blue is defocused at a much greater amount as compared to the conventional systems, but without significantly affecting resolution. It is noted that the area detected can be a size other than 5×5 pixels, and specifically can be larger or smaller, and the area can be other than square-shaped such as elliptical, circular, rectangular or the like.

Turning now to the details of the inventive structure and method, FIG. 4 is a block diagram of a projection television system 100 including conventional electrostatic defocus circuitry.

In the inventive system, a decoder 1 is provided for receiving a composite video signal output from a radio frequency (RF) demodulator, a camera, a video tape recorder (VTR) or any other like video source.

The decoder 1 decodes the composite video into luminance (Y), red-luminance (R-Y) green-luminance (G-Y), and blue-luminance (B-Y). It is noted that while four signals are illustrated, three of the above signals could be used, as opposed to all four. While one of the signals is redundant, if all four are used, then a more accurate color rendition may result. The decoder is a conventional circuit and is well-known to one of ordinary skill in the art.

After decoding, the signals are output from the decoder 1 and input to a video processing circuit (video processor) 2. The video processor 2 suitably processes the signals according to the designer's needs and constraints (e.g., for edge enhancement, noise reduction, dynamic color shift, and other image enhancements). Additionally, the video processor 2 may also reduce the video gain to implement current limiting.

After video processing, the four signals are matrixed by a matrixing circuit 3 into R, G, and B for the individual tubes. At this point, in a conventional projection chassis, the "blue stretch" technique would typically be applied to the blue video signal and the R, G and B signals would go to the final video drives and the tube cathodes for projection onto a display.

However, according to the unique and unobvious structure of the present invention, the blue signal of the invention flows along two paths.

A first path (e.g., the defocusing path) takes the blue signal to special defocusing circuitry and a second path (e.g., the delay path) takes the blue signal with the red and green signals into a delay line to keep the signals synchronized with the defocusing signal.

In the preferred embodiment, the B signal would follow the defocus signal processing path. Other embodiments would have either the luminance (Y) signal or the white (R+G+B) signal follow the defocus path. While the remainder of the description below refers only to the B signal in the defocus path, by implication, either of the other signals could be used in controlling the defocus processing.

In the defocussing path, as shown in FIG. 4, a low pass filter (LPF) 4 receives the blue signal and removes blue detail that is typically unobservable to the viewer's eye. Filter 4, along with the other structural components in the defocus path, are multidimensional (e.g., preferably two-dimensional). Thus, a conventional line or frame storage device (not illustrated) is advantageously provided, having a plurality of video lines of storage and preferably at least three video lines of storage are provided.

Horizontally, the low pass filter 4 has a cutoff frequency preferably within a range of substantially 500 Khz to 1 Mhz for National Television Standards Committee (NTSC) or Phase Alternation Line (PAL) video signals. For High-Definition Television (HDTV) or Data-graphics projectors, the cutoff frequency would be about ⅛ to ¼ the maximum frequency of the video signal. Of course, another cutoff frequency could be employed depending on the designer's requirements and thus the cutoff frequency is optimized. Vertical cutoff frequency is dependent on how many lines of storage the system designer and chassis manufacturer require due to system requirements and constraints. A preferred number would be about 5–7 lines. The construction of the multi-dimensional LPF 4 is well within the grasp of one of ordinary skill in the art within the purview of this application.

After having been filtered by the LPF 4, the blue video signal becomes signal B', as shown in FIG. 4, and is passed to an edge detector 5 for checking the low-pass-filtered signal B' for both vertical and horizontal edges.

The edge detector 5 in turn passes the low pass signal, B', and a signal indicating the strength of any detected edges (e.g., horizontal and vertical), to a logic circuit 6.

Logic circuit 6 calculates how much gain ($G_n$) in system brightness can be made by defocusing the blue without visible resolution reduction or blue fringing.

If $B_1$ is the maximum brightness possible without defocusing, $B_2$ is the maximum brightness possible with defocusing, and B' is the low pass blue video signal scaled into the range of 0–1, then the output of the logic circuitry is as follows:

if $B'<B_1/B_2$:

$$G_n=1.0 (\text{no defocus needed}) \quad (4)$$

if $B'>B_1/B_2$ and an edge is detected:

$$G_n=1.0 (\text{defocus would lead to blue fringing}) \quad (5)$$

if $B'>B_1/B_2$ and no edge is detected:

$$G_n=B'*B_2/B_1. \quad (6)$$

The maximum gain allowed, of course, is $$G_n=B_2/B_1. \quad (7)$$

The edge detector may supply information on edge strength, not just information on the presence or absence of an edge. This edge strength can be represented by E, where E=1 for a full black to full white step, and E=0 for a constant light level, with E being linear or nonlinear in between these extreme values, depending on the requirements of the system. In this case, equation 6 could be replaced by:

if B'>B₁/B₂ and an edge is detected:

$$G_n = E + (1-E) * B'^* B_2/B_1)  \quad (8)$$

For example, if the non-linear function E is defined such that for no edge, E=0, and for any edge regardless of strength, E=1, then equation 8 is a restatement of equations 5 and 6.

Figure 1:
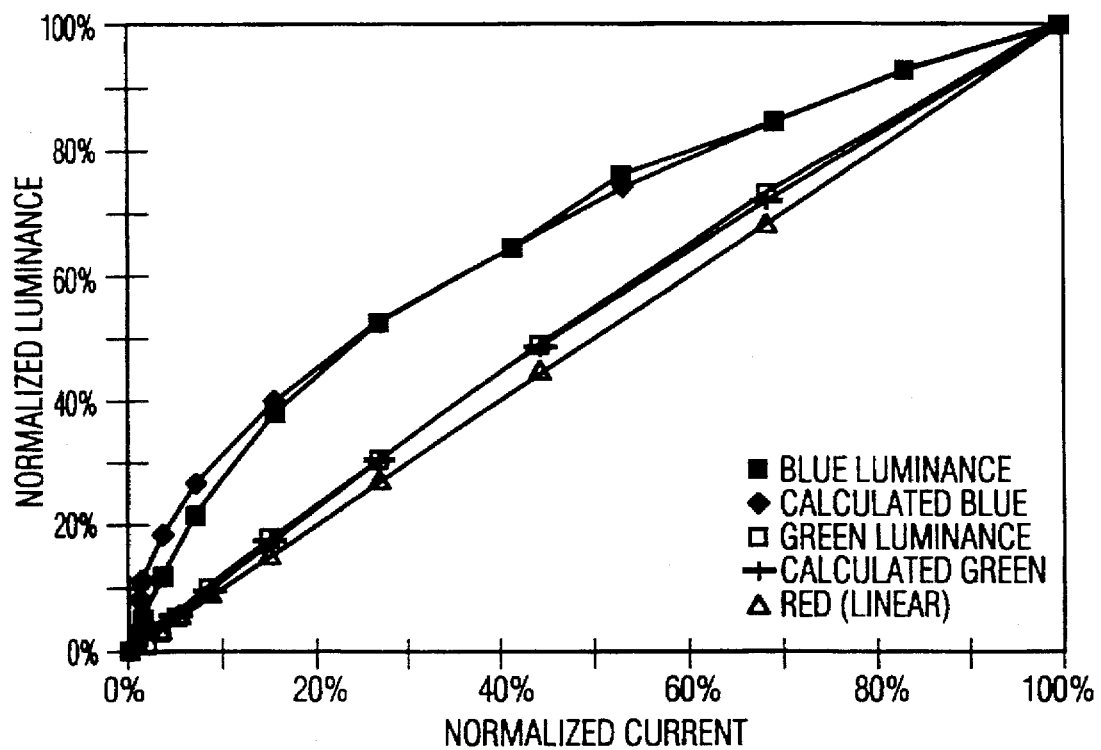
FIG. 1 is a graph illustrating a relationship between luminance and current of red, green and blue phosphor guns in a projection television.
Figure 2:
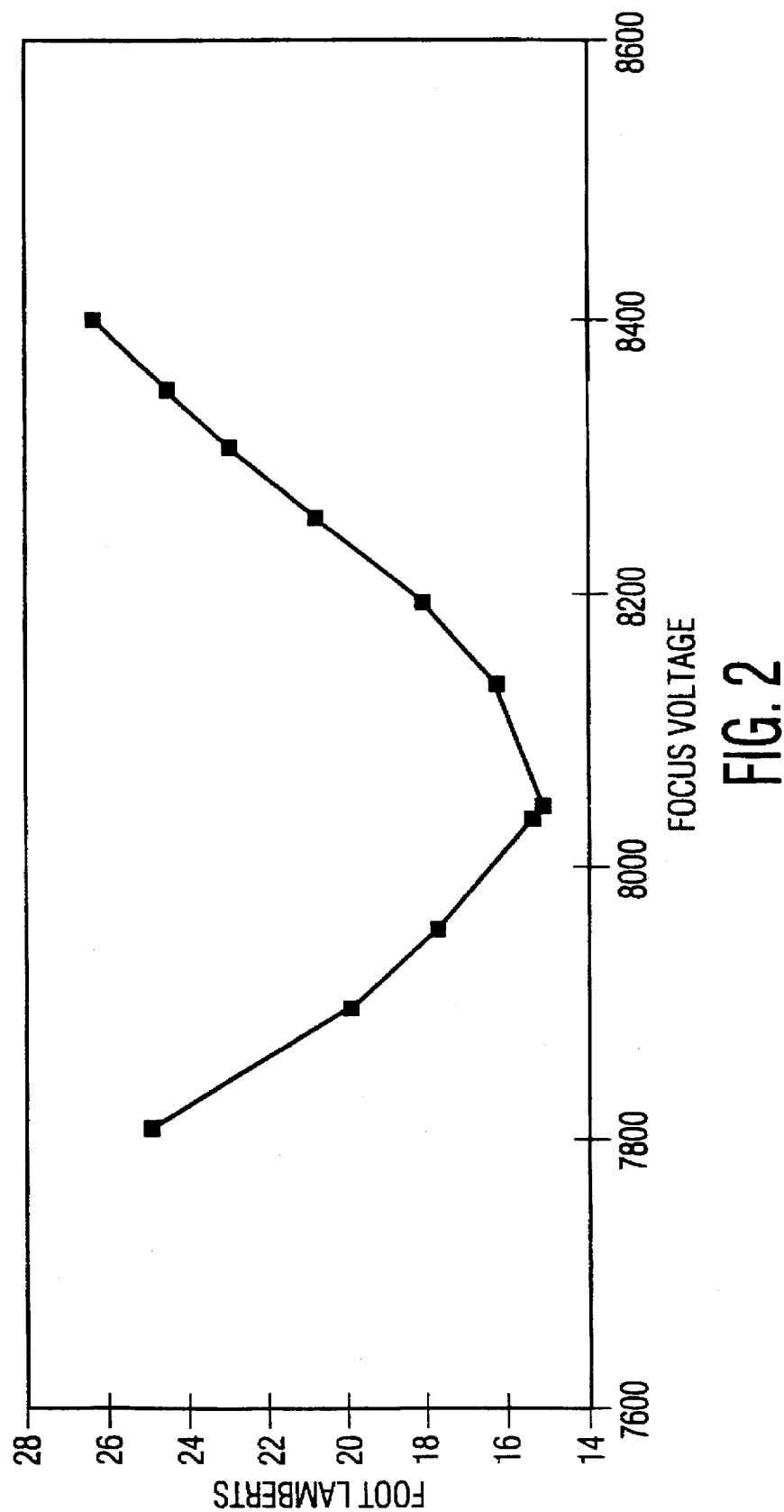
FIG. 2 is a graph illustrating a change in luminance of a blue projection tube as the tube is defocused at a constant anode current.
Figure 3:
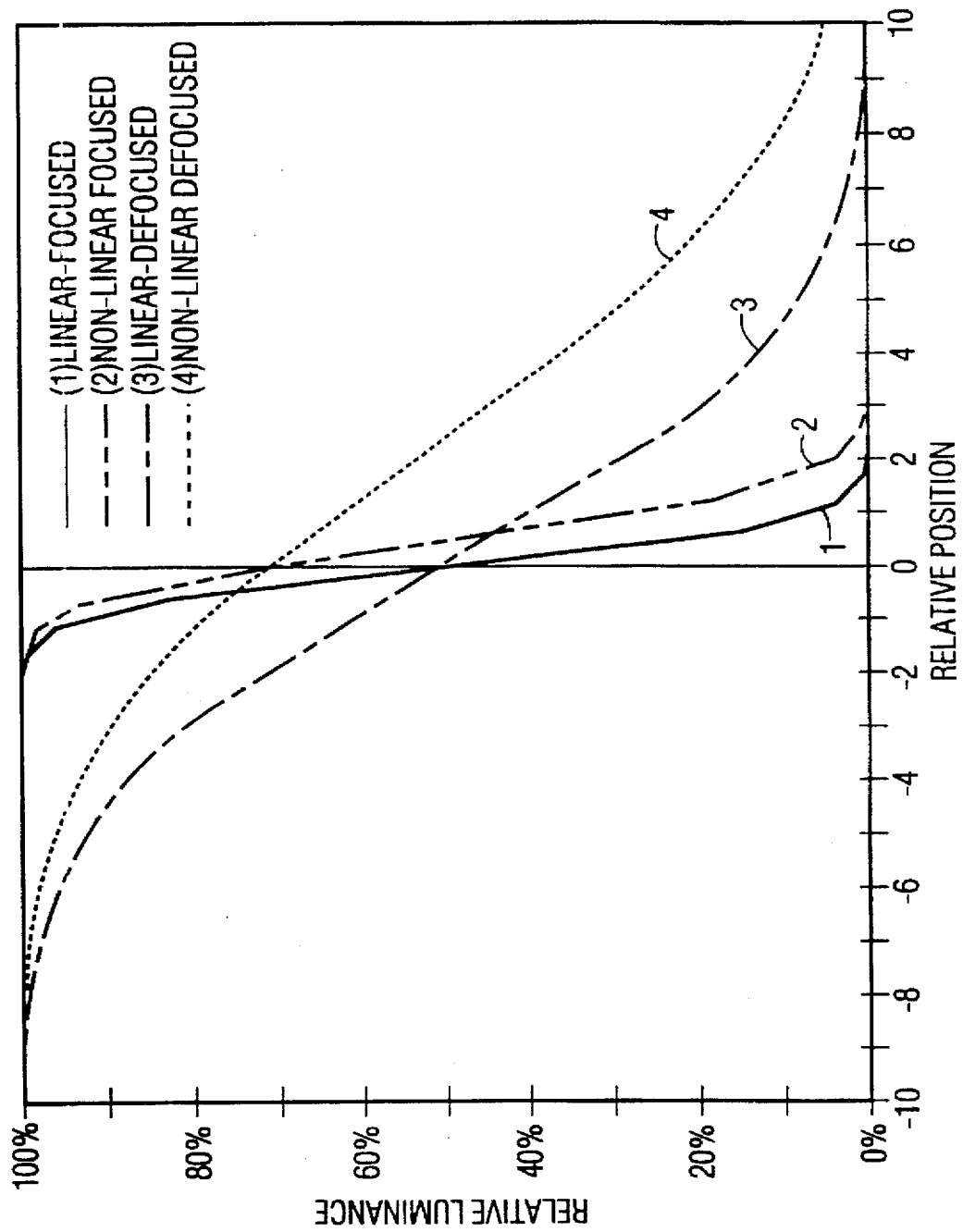
FIG. 3 is a graph illustrating the affect of defocussing the electron gun on linear and non-linear phosphors in a projection television.

The tube in FIG. 2 would have a maximum gain of about $G_n=1.75$, depending on the maximum acceptable spot size and focus voltage.

Then, the red and green video signals (having been delayed by a delay line 7) are multiplied by this gain signal by multiplying circuits 9, 10, respectively, so that the red, green and blue signals are kept in correct proportion to produce the desired color. The delay line 7 must have a suitable delay to keep the unprocessed R, G, and B video signals in synchronism with the processed B' signal in the defocus path. For example, if a 5-line vertical low pass filter is used as the vertical part of the low pass filter 4, the unprocessed R, G and B signals would typically require approximately 3 video lines of delay.

The defocus circuit 8 converts the gains required in the B signal into the defocus required to achieve this luminance increase. Generally, this will be a nonlinear function. In the tube represented in FIG. 2, however if a slight static defocus is applied, the additional defocus would be substantially linear for the factor $(G_n-1)$.

In addition to performing this nonlinear conversion, the defocus circuit must drive the focus grid of the tube. A typical defocus circuit 8 for a consumer projection tube would be required to drive about 200–400V 2 Mhz defocus voltage into the focus grid that typically floats at 7–9 kV from ground.

Thereafter, adder (summing) circuit 12 adds the defocus voltage produced by defocussing circuit 8 to the static focus voltage produced by a focus voltage source 11, preferably providing a voltage of 7–9 kV, and a combined voltage is applied to the focussing grid 15 of the blue projection tube 13.

One approach for the design of the adder circuit 12 for the defocus voltage and the static focus voltage 11 is to use a transformer with sufficient isolation. This is possible because with real video signals, the defocus signal from the defocus circuit 8 contains only alternating current (AC) voltages. There will be no direct current (DC) focus offset, regardless of signal content. If the transformer has a 4:1 turns ratio., the defocus circuit must only produce approximately 50–100V, not 200–400V, albeit at a 4× higher current. This lower voltage/higher current approach is more in keeping with current semiconductor technology and should be easier to implement than a direct 200–400V, 2 Mhz system.

The sum of the currents in the red, green and blue projection tubes is applied to video processing circuit 2 as an anode sensing current for current limiting subsequently so that over tubes are prevented from being overdriven and thereby damaged.

The above structure is advantageous in that the blue output (and therefore the white output) is increased by defocusing the blue without significantly affecting resolution.

However, a problem with the above-described electrostatic defocus implementation is that the defocus voltage for the blue tube is on the order of 200–400V, and must vary at near video rates (about 2 Mhz) into a significant capacitive load. While this is difficult to accomplish, it is not impossible even without a transformer for coupling. For instance, the final video drive 14, as shown in FIG. 4, typically has 140V with a 4 Mhz response, and high definition television (HDTV) systems typically have up to 220V drive with a 20 Mhz response.

A second problem with this implementation is that not all electron guns defocus gracefully (e.g., predictably). A small percentage of guns in any lot of tubes perform satisfactorily when focused, but are not usable when defocused. While this problem may be overcome with quality control and design changes, costlier manufacturing steps and components are required.

A second embodiment of the present invention is provided for overcoming the above problems of the first embodiment and includes structural components for providing a feature of "Spot Wobble Defocus".

Due to the physics of the blue phosphor, defocusing parallel to the scan lines does not increase total luminance. Therefore, a defocusing scheme that operates only vertically and does not affect the horizontal spot size is preferable to the electrostatic defocus, described above, which affects the beam both horizontally and vertically. The present inventor has discovered that spot wobble is a method of providing such a scheme.

Figure 5A:
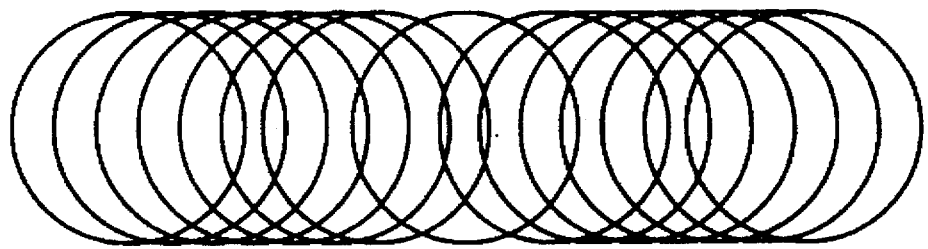
FIGS. 5A and 5B illustrate the phenomena of no beam wobbling and beam wobbling or spot wobbling, respectively, which occurs in the projection television system according to a first embodiment of the present invention.
Figure 5B:
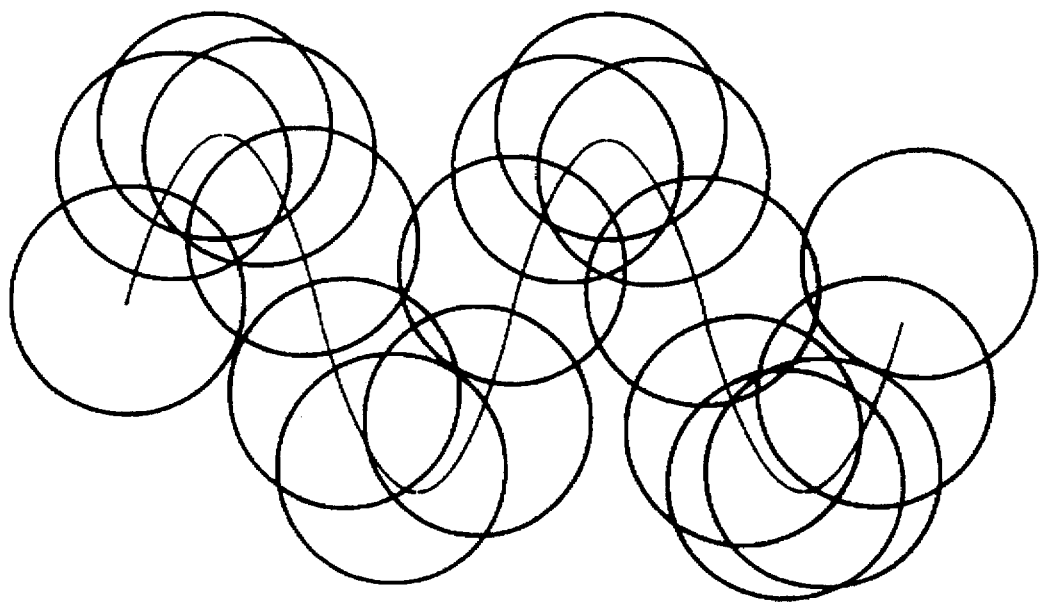

Spot wobble is the rapid motion of the electron beam perpendicular to the raster lines and the effects of wobbling are more clearly illustrated in FIGS. 5A and 5B. Each circle in both FIG. 5A and 5B represents the beam location and extant at 0.017µS intervals. FIG. 5A illustrates no beam wobbling, whereas FIG. 5B illustrates beam wobbling at 10 Mhz.

As shown in FIG. 5B, the beam falls on a much larger area of the phosphor as compared to the beam of FIG. 5A. This occurrence, as shown in FIG. 5B, significantly lowers current density, and in the case of a non-linear phosphor (e.g., such as blue), increases the light output. Spot wobble can be achieved either electrostatically or magnetically.

To have the desired affect on focus and phosphor linearity, and to avoid video artifacts (e.g., moiré and interference with the color subcarrier), spot wobble must be at a frequency significantly higher than the video frequency, for instance 10 Mhz for conventional 4.2 Mhz National Television Standards Committee (NTSC) video signals. The motion of the spot perpendicular to the scan line increases the effective size of the spot in the vertical direction.

This spot motion is relatively easy to achieve. For example, in a scan velocity modulation (SVM) system, such as in many current television receivers, motion parallel to the scan lines is used to enhance apparent resolution.

In the second embodiment of the present invention, such motion is preferably generated by a small magnetic coil (e.g., such as one disclosed in U.S. Pat. 5,223,769, or U.S. Pat. No. 5,179,320, both of which are incorporated herein by reference) on the neck of the tube.

For example, an SVM coil is placed on a projection tube rotated 90° so that the motion is perpendicular to the scan line, rather than parallel. When a current of 150 mA is applied to the coil by a driver, the spot is deflected by approximately ½ scan line. Such a structure and operation is sufficient to produce a noticeable effect on brightness. The SVM-like coil is optimally designed with a resonant supply that wobbles the spot at the required frequency (e.g., driving 150 mA into a 7.1 µH SVM coil at 10 Mhz). Then, the wobble is amplitude modulated with the output from the defocus logic circuit.

Figure 6:
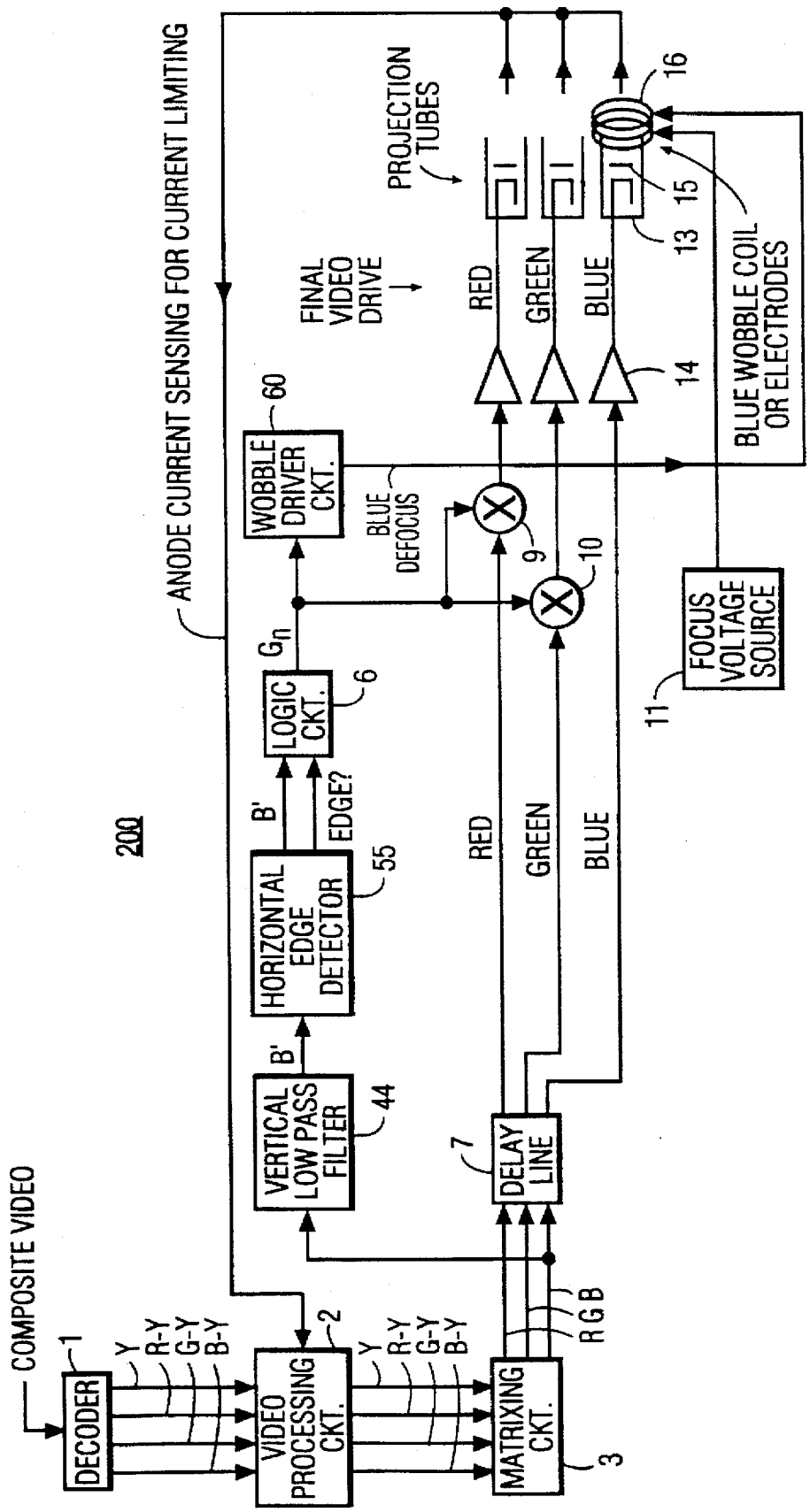
FIG. 6 is a block diagram of a projection television system according to a second embodiment of the present invention.

FIG. 6 illustrates the second embodiment of the invention and specifically shows a spot-wobble-based area dependent blue defocus system 200.

The second embodiment has a structure somewhat similar to that of the first embodiment, and thus for consistency the same reference numerals are used for the same components found therein. Further, for brevity, only the different components will be described and thus the components in the second embodiment which are the same as those of the first embodiment will not be described again.

In the system 200 of the second embodiment of the present invention, similarly to the first embodiment, the blue (or luminance or white) signal flows along the defocussing path which takes the blue signal to the special defocussing circuitry and the second path which takes the blue signal with the red and green signals into the delay line 7 to keep the signals synchronized with the defocussing signal.

Low pass filter (LPF) 44 receives the blue signal from the matrix circuit 3. In contrast to the multi-dimensional filter of the first embodiment, the LPF 44 is a one-dimensional (e.g., vertical) low pass filter which receives the blue signal and removes blue detail that is typically unobservable to the viewer's eye. The LPF 44 has a preferred response corresponding to 5–7 video lines.

After having been filtered by the LPF 44, the blue video signal becomes signal B', and is passed to a horizontal edge detector 55 for checking the low passed signal B' for horizontal edges in the video signal. Since spot wobble expands the blue only vertically, there is no possibility of getting a blue border at vertical edges in the video signal. It is noted that, due to the storage requirements of a vertical low pass filter, using a horizontal edge detector may not be significantly simpler, from an electronic hardware point of view, than a 2-D low pass filter and edge detector. The edge detector has a conventional structure known to one of ordinary skill in the art and thus for brevity its structure will not be described herein.

The edge detector 55 in turn passes the low pass signal, B', and a signal indicating the strength of any detected horizontal edges, to logic circuitry 6.

After having been determined by logic circuit 6 using the relationships in equations 4, 5, and 6 or in equations 4 and 8, the gain is input to a wobble driver 60. Simultaneously, the red and green video signals (having been delayed by a delay line 7) are multiplied by the gain signal determined by logic circuit 6 by the multiplying circuits 9, 10, respectively, so that the red, green and blue signals are kept in correct proportion to produce the desired color.

Wobble driver 60 takes the gain signal determined by the logic 6 and evaluates the normally nonlinear function relating wobble amplitude to gain in blue output. The wobble driver 60 must then supply sufficient voltage to drive the wobble coil 16 by the required amount.

The focus voltage produced by the focus source 11 is supplied to the focussing grid 15 in the conventional manner. Since the focus voltage and the defocus drive are supplied to different places, it is unnecessary to mix the static focus voltage with the defocus signal.

Thus, wobble driver 60 is provided for receiving the gain signal and the blue defocussing is calculated and is input to a blue wobble coil or electrodes 16 of the blue projection tube, along with focussing voltage produced by focus voltage source 11.

As in the first embodiment, the sum of the red, green and blue anode currents is applied to video processing circuit 2 as an anode sensing current for current limiting subsequently.

The above structure is advantageous in that the structure is relatively easy to construct and that the problem of electron guns defocussing unpredictably is overcome.

Another advantage of the second embodiment is that there is no longer any need to add the defocus signal to the 7–9 kV static focus voltage.

A further advantage of the second embodiment is that it produces no horizontal defocus and therefore no horizontal resolution degradation.

Yet another advantage of the second embodiment is the vertical defocus effectively produces a more square electron beam line profile. This provides better control over blue nonlinearity and vertical resolution than the gaussian-shaped profile typically produced by electrostatic defocus.

Due to the superior control over beam shape, current density and phosphor nonlinearity, spot wobble may be used alone in a static defocusing system, without dependence upon the video signal content. While not as effective as using video content to control the amount of defocus, this technique provides additional blue light without visible blue fringing or loss of resolution when compared to the previous practice of static defocusing using electrostatic means. While the gain in blue light is less than when defocus is dependent upon video content, the circuitry is significantly simpler and less costly to manufacture.

Thus, with the structure and method of the present invention, the blue tube is defocused to increase overall system luminance. The blue defocussing operation is made dependent on the video signal content, since static defocusing leads to a blue border around a white area.

Hence, when there is a solid area of blue, defocussing of the blue is not problematic since there is no edge for the blue to spill over and form a blue border. At an edge, the blue gun is brought to a good focus to avoid this spill-over. Conversely, when the video signal requires brightness levels low enough so the focused blue gun can produce sufficient luminance, the inventive circuitry makes a suitable determination and thus there is no need to defocus.

Thus, the problems of the conventional systems, in which blue defocussing is a constant depends only on the amount of blue drive required (not the areas on the screen of the blue, as in the invention), and which severely limit the amount of blue defocussing that can be performed because of resolution concerns, are overcome. The invention, which is employable in a CRT projection TV, increases the blue output (and therefore the white output) by defocussing the blue but without significantly affecting resolution.

While the invention has been described in terms of several preferred embodiments, those skilled in the art will recognize that the invention can be practiced with modification within the spirit and scope of the appended claims.

Thus, variations on both the electrostatic defocus and spot wobble embodiments are possible. For example, a specially designed tube with an auxiliary focusing grid could be employed to simplify defocus. The electron gun may be designed so that any defocus due to the auxiliary grid is only in the vertical direction. Auxiliary defocus also can be magnetic or electrostatic.

Further, spot wobble may be achieved by electrostatic forces instead of magnetic forces. The grids for electrostatic wobble would preferably be designed into the gun.

Defocus also could be calculated on the basis of a luminance signal (Y) or a white signal (R+G+B), rather than the blue signal alone. Thus, instead of the blue area detector, the filter could be implemented as a luminance or white area detector for compatibility with existing luminance processing techniques.

Finally, control circuitry can be implemented in digital or analog form. Indeed, the LPF can be either digital or analog. In analog form, the most cost effective filter would probably be for rectangular shapes rather than for square or some other shape. A blue size detector can be implemented as a three line vertical by about 500 kHz horizontal low pass "brick wall" filter.

Having thus described my invention, what I claim as new and desire to secure by Letters Patent is as follows:

1. A projection television system for projecting images having a plurality of color components, comprising:
   means for filtering a first color component signal from a composite signal to provide a filtered first color component signal;
   means for defocusing said first color component signal based on said filtered first color component signal; and
   means for adjusting a gain of at least one other of a plurality of color component signals of said composite signal,
   wherein an amount of defocusing performed by said means for defocusing and an adjustment of said gain by said means for adjusting are dependent on a content of said composite signal.

2. An apparatus according to claim 1, wherein said means for defocusing comprises a defocusing circuit for defocusing said first color component.

3. An apparatus according to claim 2, wherein said defocusing circuit comprises a defocus voltage generator for generating a defocus voltage and means for applying said defocus voltage to an electrostatic focus grid.

4. An apparatus according to claim 2, wherein said defocusing circuit comprises a defocus current generator for generating a defocus current and means for applying said defocus current to an electromagnetic focus coil.

5. An apparatus according to claim 1, wherein said means for defocusing comprises a spot wobble defocusing circuit for adjusting the first color component in a first direction while not affecting the first color component in a second direction.

6. An apparatus according to claim 5, wherein said spot wobble defocusing circuit comprises a spot wobble voltage generator for generating a spot wobble voltage and means for applying said spot wobble voltage to an electrostatic spot wobble grid.

7. An apparatus according to claim 5, wherein said spot wobble defocusing circuit comprises a spot wobble current generator for generating a spot wobble current and means for applying said spot wobble current to an electromagnetic spot wobble coil.

8. An apparatus according to claim 5, wherein said first direction comprises a vertical direction and said second direction comprises a horizontal direction.

9. An apparatus according to claim 2, further comprising a detector for detecting an edge of said filtered first color component signal and providing said edge and said filtered first color component signal to said means for defocusing.

10. An apparatus according to claim 9, wherein said detector comprises a multi-dimensional detector.

11. An apparatus according to claim 5, further comprising a detector for detecting an edge of said filtered first color component signal and providing said edge and said filtered first color component signal to said means for defocusing.

12. An apparatus according to claim 11, wherein said detector comprises a one-dimensional detector.

13. An apparatus according to claim 2, further comprising a logic circuit for multiplying at least one of the other color component signals by a gain determined by said filtered first color component signal.

14. An apparatus according to claim 2, further comprising:
   a delay circuit for receiving and delaying said first color component signal and second and third color component signals of said composite signal; and
   multiplier circuits for multiplying said second and third color components signals of said composite signal by a gain determined by said filtered first color component signal.

15. An apparatus according to claim 2, further comprising an adder for receiving said first color component signal having been refocused, and a focus voltage source for providing a focus voltage to said adder, said adder issuing an output.

16. An apparatus according to claim 15, wherein said adder comprises a transformer for coupling said first color component signal having been defocused with said focus voltage.

17. An apparatus according to claim 15, further comprising a projection tube having a focus grid for projecting said first color component, said focus grid receiving said output from said adder.

18. An apparatus according to claim 5, further comprising a logic circuit for multiplying at least one of the other color component signals of said composite signal by a gain determined by said filtered first color component signal.

19. An apparatus according to claim 5, further comprising:
   a delay circuit for receiving and delaying said first color component signal and second and third color component signals; and
   multiplier circuits for multiplying said second and third color components signals of said composite signal by a gain determined based on said filtered first color component signal.

20. An apparatus according to claim 5, further comprising a projection tube having a wobble coil for projecting said first color component, and a focus voltage source for producing a static focus voltage,
   said wobble coil receiving said output from said spot wobble defocusing circuit.

21. A method of projecting images having a plurality of color components for use with a projection television system, comprising:
   defocusing a first color component signal from a composite signal of an image; and
   adjusting a gain of at least one other of said plurality of color component signals,
   wherein an amount of defocusing performed in said defocusing step and an amount of adjustment of said gain in said adjusting step are dependent on a content of said composite signal.

22. A method according to claim 21, further comprising a step of determining said amount of defocusing and an amount of said adjusting of said gain based on one of a first color component signal having been filtered, and a filtered combination of said first color component signal and at least one other color component signal.

23. A method according to claim 22, further comprising a step of detecting a plurality of edges of one of said filtered first color component signal and said filtered combination of signals.

24. A method according to claim 23, wherein said detecting step comprises detecting edges in only a single direction, and said defocusing step comprises a step of defocusing only in a direction perpendicular to said edges.

25. A method according to claim 21, wherein said step of defocusing comprises a step of defocusing by one of electrostatic defocusing and electromagnetic defocusing.

26. A method according to claim 21, wherein said step of defocusing comprises a step of defocusing by spot wobble defocusing.

27. A projection television system for projecting images having a plurality of color components, comprising:

means for defocusing a first color component, said means for defocusing comprising a spot wobble system comprising one of a spot wobble electromagnetic coil and a spot wobble electrostatic grid;

means for driving said one of said spot wobble electromagnetic coil and said spot wobble grid with a constant amplitude alternating current (AC) drive; and means for adjusting a gain of at least one other of a plurality of color components.

28. A method of projecting images having a plurality of color components for use with a projection television system, comprising:

defocusing, with one of a spot wobble electromagnetic coil and a spot wobble electrostatic grid, a first color component signal from a composite signal of an image, said composite signal including a plurality of color component signals; and adjusting a gain of at least one other of said plurality of color component signals.

* * * * *